April 17, 1928.  1,666,593
F. BURGESS
ADJUSTABLE SELF ALIGNING BEARING
Filed Dec. 9, 1926
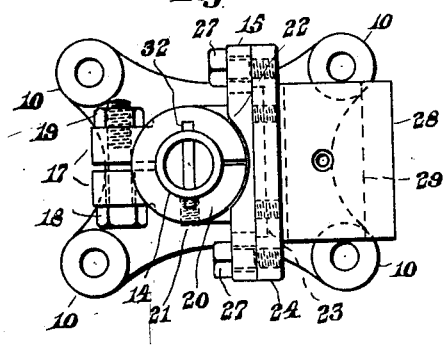
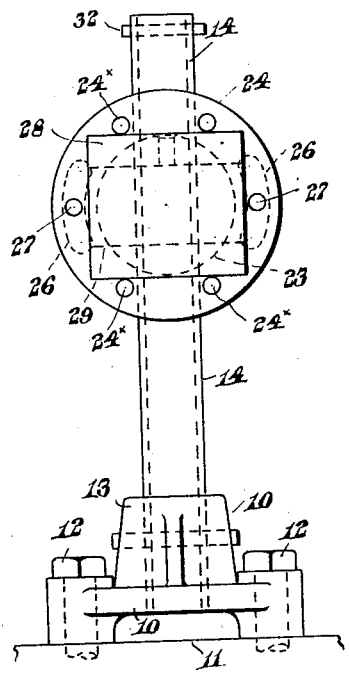
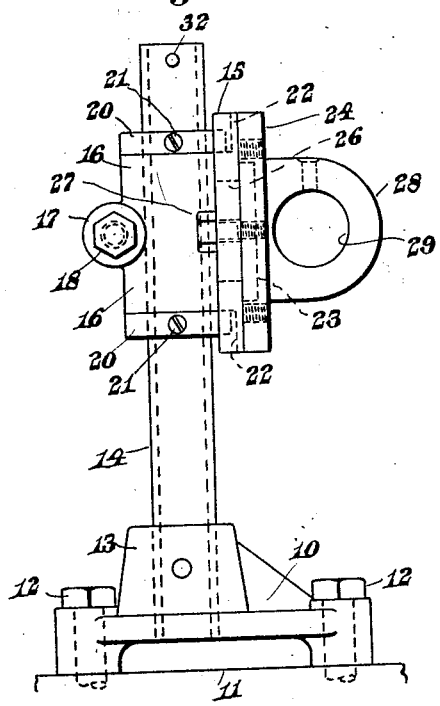
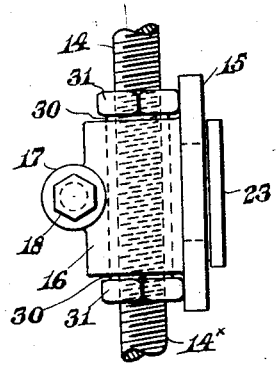
Inventor:
Frank Burgess,
by Walter E. Lombard.
Atty.

Patented Apr. 17, 1928.

1,666,593

UNITED STATES PATENT OFFICE.

FRANK BURGESS, OF WOLLASTON, MASSACHUSETTS.

ADJUSTABLE SELF-ALIGNING BEARING.

Application filed December 9, 1926. Serial No. 153,566.

This invention relates to supports for the bearings for rotary shafts and has for its object the production of a device of this character which is adjustable and of which the bearing is adapted to automatically aline itself with the axis of the shaft.

This object is attained by the mechanism illustrated in the accompanying drawings.

For the purpose of illustrating the invention, one preferred form thereof is illustrated in the drawings, this form having been found to give satisfactory and reliable results, although it is to be understood that the various instrumentalities of which the invention consists can be variously arranged and organized, and the invention is not limited to the precise arrangement and organization of these instrumentalities as herein shown and described except as required by the scope of the appended claim.

Of the drawings

Figure 1 represents a plan of a self-aligning bearing support embodying the principles of the present invention.

Figure 2 represents a side elevation of the same.

Figure 3 represents a front elevation of the same, and

Figure 4 represents a modification of the means for adjustably mounting the swivel bearing support upon the standard.

Similar characters indicate like parts throughout the several figures of the drawings.

In the drawings 10 is a base adapted to be secured to any fixed member 11 by means of the bolts 12.

This base 10 is provided with an upwardly extending boss 13 in which is fixedly secured the vertical member or standard 14 which may be tubular as shown.

Slidably mounted upon this standard 14 is a support 15 having a split projection 16 encircling the standard 14.

The projection 16 has oppositely disposed ears 17 through which extends a clamping bolt 18 having a nut 19 threaded thereto.

By releasing the nut 19 the projection 16 may be adjusted lengthwise of the standard 14 and then clamped in its adjusted position.

Above and below the end faces of the projection 16 are split collars 20 which are locked to the standard by means of the screws 21.

The support 15 is cylindrical and is closely adjacent the standard 14 as shown in the drawings, the rear face of said support having depressions 22 therein into which project portions of the collars 20, as indicated in dotted lines in Fig. 2.

The support 15 has centrally disposed on its outer face a cylindrical projection 23 which is fitted to a depression in the swivel bearing 24.

The support 15 is also provided with oppositely disposed concentric slots 26 through which extend the headed bolts 27 screwed into the swivel bearing 24 and preventing the displacement of said bearing from the projection 23 while permitting free movement of said bearing about the axis of said projection to a limited extent.

The bearing member 24 has a projection 28 on its outer face extending transversely thereof, this projection having a bore 29 extending from end to end thereof.

This bore 29 is adapted to have a rotatable shaft mounted therein, said shaft contacting with the wall of the bore.

If desired the shaft may be smaller than the bore and revolve in roller or ball bearings located within said bore. As this construction forms no part of the present invention it is deemed unnecessary to illustrate the same.

It will be noted that the bore 29 is closely adjacent the outer face of the swivel bearing 24, thus bringing the shaft as near as possible to the standard 14 so that there will be the least possible overhang.

This is of great advantage as the nearer the shaft is to the standard the less binding there is on the movable parts and consequently less wear.

It will be noted by referring to the drawings that the bore through the projection 16 is of sufficient length to prevent all tilting of the support 15 on said standard, and the outer face of the support 15 must always be parallel to the axis of said standard in any position it may be moved.

Moreover, with the wide contacting faces of the support 15 and the swivel bearing 24 there is no chance for one of these members to tilt relatively to the other, and the weight of the shaft in the bore 29 cannot possibly separate said members.

As a matter of fact most of the weight of the shaft will be sustained by the projection 23 on the member 15 which projection accurately fits the depression in the bearing member 24.

As shown in the drawings, portions of the base 10 extend outwardly from the standard 14 to a point beyond the bore 29 thus giving greater rigidity to the entire device.

The bearing member has a plurality of threaded holes 24$^x$ into any opposed two of which the screws 27 may be disposed so that the bore 29 may assume any position throughout 360°.

In other words the bore 29 may be adjusted to any desired angle relatively to the axis of the standard 14.

If desired a sleeve 30 may be mounted within the bore of the projection 16, this sleeve surrounding a threaded standard at the opposite ends of said sleeve.

A pin 32 extending through the upper end of said standard limits the upward movement of the member 15.

This makes a very simple but most effective bearing support for rotatable shaft, which will automatically aline itself with said shaft.

The clamping mechanism 18, 19 is never used to clamp the projection rigidly to the standard 14 but is utilized only to take up the wear so that the bore of the projection 16 will always nicely fit the standard 14. Consequently the support 15 is free at all times to move about the axis of the standard 14.

By means of these two movements, that is the movement of the support 15 about the vertical axis of the standard 14 and the movement of the bearing member 24 about the horizontal axis of the support 15, it is evident that the bearing member 24 will accommodate itself automatically to any angle that the support shaft may assume.

It is believed that the operation and many advantages of the invention will be well understood without further description.

Having thus described my invention, I claim:

The combination of a standard having an unbroken cylindrical surface; a support adjustable lengthwise thereof and adapted to freely move about the axis thereof, said support having a cylindrical disk provided with a plurality of concentric slots; a bearing member provided with a cylindrical flange in contact with said disk, said flange having a plurality of sets of threaded holes therein; and headed members extending through said slots into either set of holes in said bearing member and freely movable lengthwise of said slots.

Signed by me at 746 Old South Bldg., Boston, Mass., this 3rd day of December, 1926.

FRANK BURGESS.